US012763930B2

(12) United States Patent
Anantharaman

(10) Patent No.: US 12,763,930 B2
(45) Date of Patent: Oct. 13, 2026

(54) LIGHTWEIGHT ENCRYPTION

(71) Applicant: Microsoft Technology Licensing, LLC, Redmond, WA (US)

(72) Inventor: Hariharan Anantharaman, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 95 days.

(21) Appl. No.: 19/002,357

(22) Filed: Dec. 26, 2024

(65) Prior Publication Data

US 2026/0189367 A1 Jul. 2, 2026

(51) Int. Cl.
*H04L 9/08* (2006.01)
*H04L 9/40* (2022.01)

(52) U.S. Cl.
CPC ........ *H04L 9/0819* (2013.01); *H04L 63/0428* (2013.01); *H04L 63/0435* (2013.01)

(58) Field of Classification Search
CPC ............... H04L 9/0819; H04L 63/0428; H04L 63/0435
See application file for complete search history.

(56) References Cited

U.S. PATENT DOCUMENTS

| | | | | |
|---|---|---|---|---|
| 6,745,220 | B1 * | 6/2004 | Hars | H04L 9/08 380/28 |
| 8,422,685 | B2 | 4/2013 | Al-Somani | |
| 12,425,191 | B1 | 9/2025 | Pecoraro | |
| 2006/0282491 | A1 * | 12/2006 | Joye | G06F 7/725 708/492 |
| 2015/0110269 | A1 | 4/2015 | Ohya | |

FOREIGN PATENT DOCUMENTS

| | | | | |
|---|---|---|---|---|
| WO | WO-2007005563 A2 * | 1/2007 | | H04L 9/3066 |

OTHER PUBLICATIONS

A. Shamir, R. Rivest, L. Adleman, “Mental Poker”, 1981, The Mathematical Gardner, Springer, edited by Klarner, D.A., pp. 37-43 ( Year: 1981).*

“Advanced Encryption Standard”, Wikipedia, archived on the Internet Archive on Jan. 1, 2023, retrieved from https://web.archive.org/web/20230101063854/https://en.wikipedia.org/wiki/Advanced_Encryption_Standard (Year: 2023).*

(Continued)

*Primary Examiner* — Christopher A Revak
*Assistant Examiner* — Daniel M Habashi
(74) *Attorney, Agent, or Firm* — Schwegman Lundberg & Woessner, P.A.

(57) ABSTRACT

A lightweight encryption method is disclosed, designed to reduce computational resource demands on devices such as IoT devices and mobile phones. The method utilizes Shamir’s three-pass protocol for key exchange, converting the encryption key into a signed digit number using an odd base. The message is broken into portions, with each portion encrypted by applying a sequence of non-commutative functions based on the signed digit representation of the key. This approach provides secure encryption while minimizing power and resource consumption.

20 Claims, 7 Drawing Sheets

(56) References Cited

OTHER PUBLICATIONS

"Federal Information Processing Standards Publication 197: Advanced Encryption Standard (AES)", Nov. 26, 2001, National Institute of Standards and Technology, as updated May 9, 2023 (Year: 2023).*

International Search Report and Written Opinion received for PCT Application No. PCT/US2025/050848, mailed on Feb. 4, 2026, 15 pages.

International Search Report and Written Opinion received for PCT Application No. PCT/US2025/051171, mailed on Feb. 11, 2026, 17 pages.

Notice of Allowance mailed on May 7, 2026, in U.S. Appl. No. 19/002,431, 10 Pages.

"3 Pass Protocol"; Cryptography Stack Exchange; https://crypto.stackexchange.com/questions/50348/3-pass-protocol; 2017; 2 pages.

"In Cryptography, A Caesar Cipher is One of the Simplest"; SweetStudy; https://www.sweetstudy.com/questions/in-cryptography-a-caesar-cipher-is-one-of-the-simplest; 2018; 3 pages.

Ofer Rivlin; "The Three-Pass Protocol Magic", Medium; https://medium.com/@oferrivlin/the-three-pass-protocol-magic-e84614827ef0; Jan. 8, 2023; 11 pages.

Vineet Sukhraliya, et al., "Encryption and Decryption Algorithm Using ASCII Values with Substitution Array Approach"; International Journal of Advanced Research in Computer and Communication Engineering (IJARCCE), vol. 2, Issue 8, www.ijarcce.com; Aug. 2013; pp. 3094-3097.

* cited by examiner

LIGHTWEIGHT ENCRYPTION

TECHNICAL FIELD

Embodiments pertain to encryption. Some embodiments relate to computationally lightweight encryption techniques.

BACKGROUND

Encryption may be used whenever two parties wish to communication with each other over an unsecure network while preventing unauthorized interception of their messages. Encryption may be used whenever two parties wish to communicate securely over a network while preventing unauthorized interception of their messages. Traditional encryption methods require the parties to share encryption keys, either using the same key (symmetric encryption) or corresponding public/private key pairs (asymmetric encryption). The security of these encryption methods relies on the computational difficulty of decrypting messages without knowledge of the correct encryption keys.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
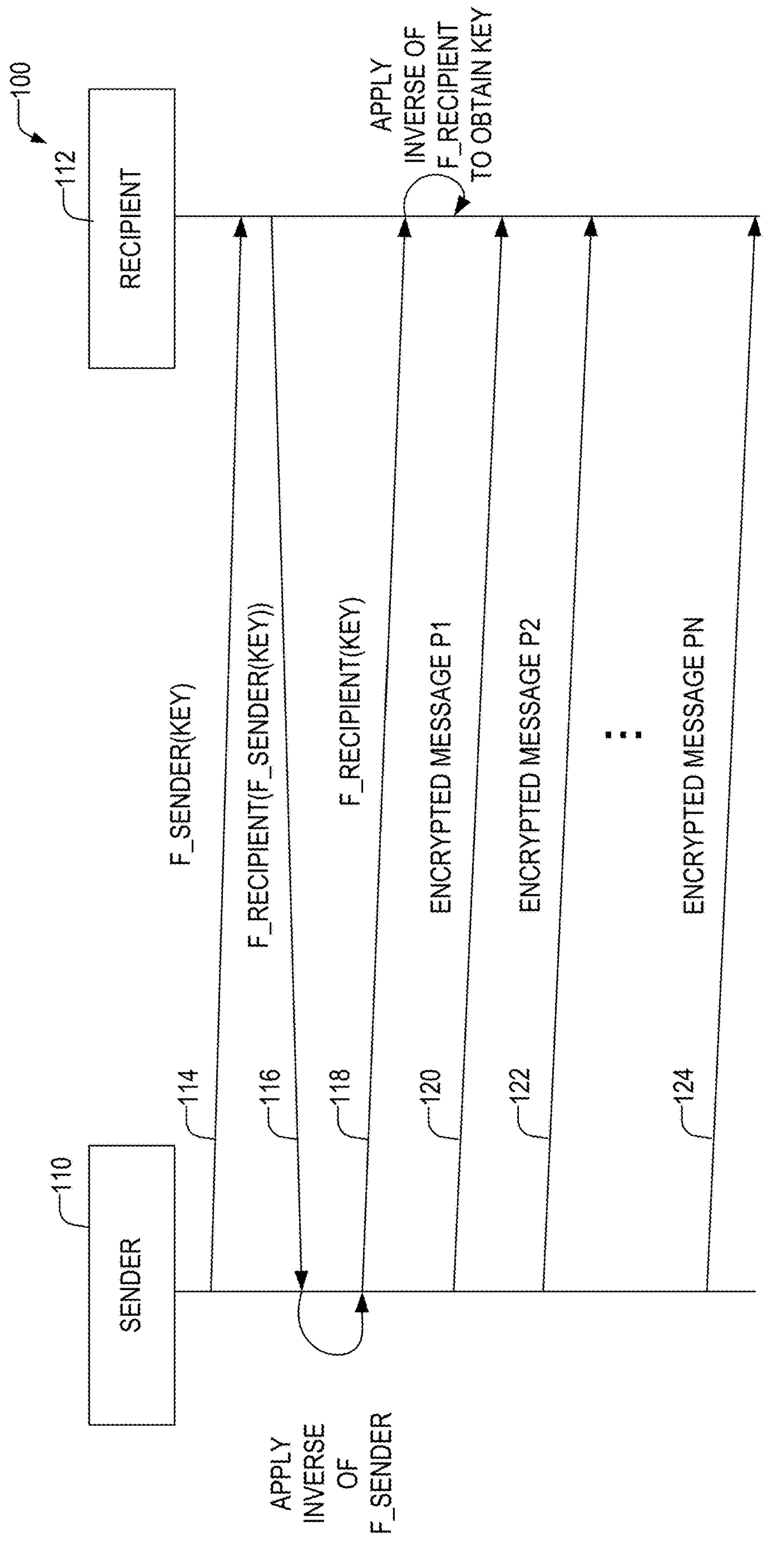
FIG. 1 illustrates a message flow of a lightweight encryption method according to some examples of the present disclosure.

Prior art encryption algorithms are resource intensive, requiring significant processor and memory resources. These resource demands strain some types of devices such as Internet of Things (IoT) devices which are built to have lightweight hardware and use a minimum of power and other resources. Other types of devices such as mobile phones may be computationally capable of prior art encryption algorithms, but the resources expended in this effort may reduce the battery life of these devices-especially if they are doing a lot of encryption and decryption.

Disclosed in some examples are systems, methods, and machine-readable mediums for a more lightweight encryption that does not sacrifice security. The encryption method starts off by exchanging an encryption key k securely, such as by utilizing Shamir's three-pass protocol. The message is then broken into multiple portions, such as individual characters, bytes, words, or the like. The encryption key k is then converted into a signed-digit representation T using an odd base (such as 3, 5, or 7). For example, the key value 7 would be converted to base 3 as T=[1,−1,1]. The system then identifies a set of non-commutative functions, where each function corresponds to a specific position in T. For example, F1(x)=x+3 might correspond to the first position, F2(x)=2x to the second position, and F3(x)=x*x to the third position. For each message portion, the encryption proceeds by selectively applying these non-commutative functions based on the values in T. When a position in T contains a positive value, the corresponding function is applied that number of times. For a negative value, the inverse of the function is applied that many times. For a zero value, no function is applied. For example, with T=[1,−1,1] and a message portion value of 100, the encryption would proceed as follows: first, apply F1(x)=x+3 once due to the 1 in the first position, yielding 103. Then apply the inverse of F2(x)=2x (which is $F2^{-1}(x)=x/2$) once due to the −1, yielding 51.5. Finally, apply F3(x)=x*x once due to the final 1, resulting in 2652.25.

While one example ordering is given above (e.g., most to least significant bit order), and an example mapping is given above which maps a positive value of the bit of T to the regular function and a negative number to the inverse, other orderings may be used, such as least to most significant bit order and other mappings may be used, such as a positive value of the bit of T to the inverse function and a negative value of the bit of T to the inverse.

The decryption process mirrors the encryption process but applies the functions and their mappings in reverse order. The recipient begins by receiving the encrypted message portions. The shared encryption key k is converted into a signed-digit representation T using the same odd base (such as 3, 5, or 7) that was used for encryption. The system identifies the same set of non-commutative functions used during encryption, where each function corresponds to a specific position in T. For example, F1(x)=x+3 corresponds to the first position, F2(x)=2x to the second position, and F3(x)=x*x to the third position. For each encrypted message portion, decryption proceeds by applying these functions in the reverse order compared to encryption, with opposite mappings. For example, if the encryption process used a mapping where a position in T with a positive value applied the function, a position in T with a negative value applied the inverse, and a zero value applied nothing, the decryption process would apply the reverse. That is, it would apply the inverse function when a position in T contains a positive value, the regular function when the digit position in T was negative and for a zero value, no function is applied.

For example, with T=[1,−1,1] and an encrypted message portion value of 2652.25, the decryption would proceed as follows: First, apply $F3^{-1}(x)$=square root(x)=51.5. Then apply F2(x)=2x once due to the value of T being −1 (opposite of applying $F2^{-1}$ during encryption), yielding 103. Finally, 7 apply $F1^{-1}(x)=x-3$ once due to the value of T being 1, resulting in the original value 100.

Finally, the decrypted portions are combined to reconstruct the original message.

By utilizing relatively easy to calculate commutative functions for key exchange and a sequence of non-commutative functions for encryption, the method provides a lightweight and secure method for encryption. This invention thus deals with the technical problems of modern encryption algorithms that are resource and power intensive by utilizing a technical solution that applies a series of known and lightweight non-commutative functions in a sequence determined by the signed digit representation of the key. The non-commutative property ensures that applying the functions in an incorrect sequence prevents successful decryption of the message—increasing security.

FIG. 1 illustrates a message flow 100 of a lightweight encryption method according to some examples of the present disclosure. The sender computing device 110 chooses a key and applies a commutative function F_SENDER to the key to create a first message. A commutative function is defined as a function f(x) that, when combined with another commutative function g(x), satisfies the property: f(g(x))=g(f(x)). The first message 114, which contains F_SENDER(KEY) is then transmitted to the recipient computing device 112. The recipient computing device 112 cannot decrypt F_SENDER(KEY), but instead, it encrypts F_SENDER(KEY) with a commutative function of its own F_RECIPIENT, to create F_RECIPIENT(F_SENDER(KEY)) which is transmitted back in a second message 116.

Sender computing device 110 cannot decrypt F_RECIPIENT(F_SENDER(KEY)). However, the sender computing device 110 applies the inverse of F_SENDER to F_RECIPIENT(F_SENDER(KEY)) to create F_RECIPIENT(KEY), which is transmitted back to the recipient with third message 118. The recipient computing device 112 then applies the inverse of F_RECIPIENT, to the third message to expose the KEY.

Once the key is exchanged the encryption process of the main message begins. The message may be broken into a plurality N of portions P. In some examples, each portion may be a token, a character, byte, word, or some other specified division. In the example of FIG. 1, each of the portions are denoted as P1, P2 . . . PN. Each message portion is encrypted separately to create encrypted portions. The key is then converted to a signed odd base representation and a plurality of non-commutative functions are identified. Each of the plurality of non-commutative functions may correspond to a digit position of the signed odd base representation of the key. For example, if the signed odd base representation of the key is three digits then a first function F1 corresponds to the first digit, a second function F2 corresponds to the second digit, and a third function F3 corresponds to the third digit. Each character is then encrypted by selectively applying each of the non-commutative functions in the plurality of non-commutative functions to the message portion based upon the value of each digit of the signed odd base representation of the key. If the digit value positive, then the non-commutative functions is applied as-is. If the digit value is negative, then the inverse of the non-commutative function is applied, and if the digit is zero, that function is not applied.

For example, if the signed odd base representation of the key is −1, 1, 1 then each of the portions of the message X are encrypted by applying the function sequence of $F1^{-1}$(F2(F3(X))). In some examples, the sequence may be reversed—that is, it may be applied as F3(F2($F1^{-1}$(X))). The ordering of the sequence may be prespecified or may be determined by messaging between the parties (the messaging may be encrypted—e.g., with the key).

As another example, if the signed odd base representation of the key is 1,0,−1, then each of the portions of the message X are encrypted by applying the function sequence of F1($F3^{-1}$ (X)). Note that because the value of the key at the F2 position is zero, the F2 function is not applied. As before, the sequence may be reversed—that is, it may be applied as $F3^{-1}$ (F1(X)).

In some examples, each of the encrypted message portions P1, P2 . . . PN may be separately encrypted and transmitted as messages 120, 122, and 124. In other examples, the encrypted portions may be transmitted as a single message. As noted, the functions used in the encryption phase are non-commutative functions which means that for any two non-commutative functions f1 and f2, f1 (f2(x))!=f2(f1(x)).

Likewise, when the recipient computing device 112 receives the message portions, it may utilize a reverse process to decrypt the message. For example, by applying the opposite of the functions applied by the sender and in reverse order. So, if the sender applies $F1^{-1}$(F2(F3(X))), the receiver applies $F3^{-1}$($F2^{-1}$(F1(X)).

Figure 2:
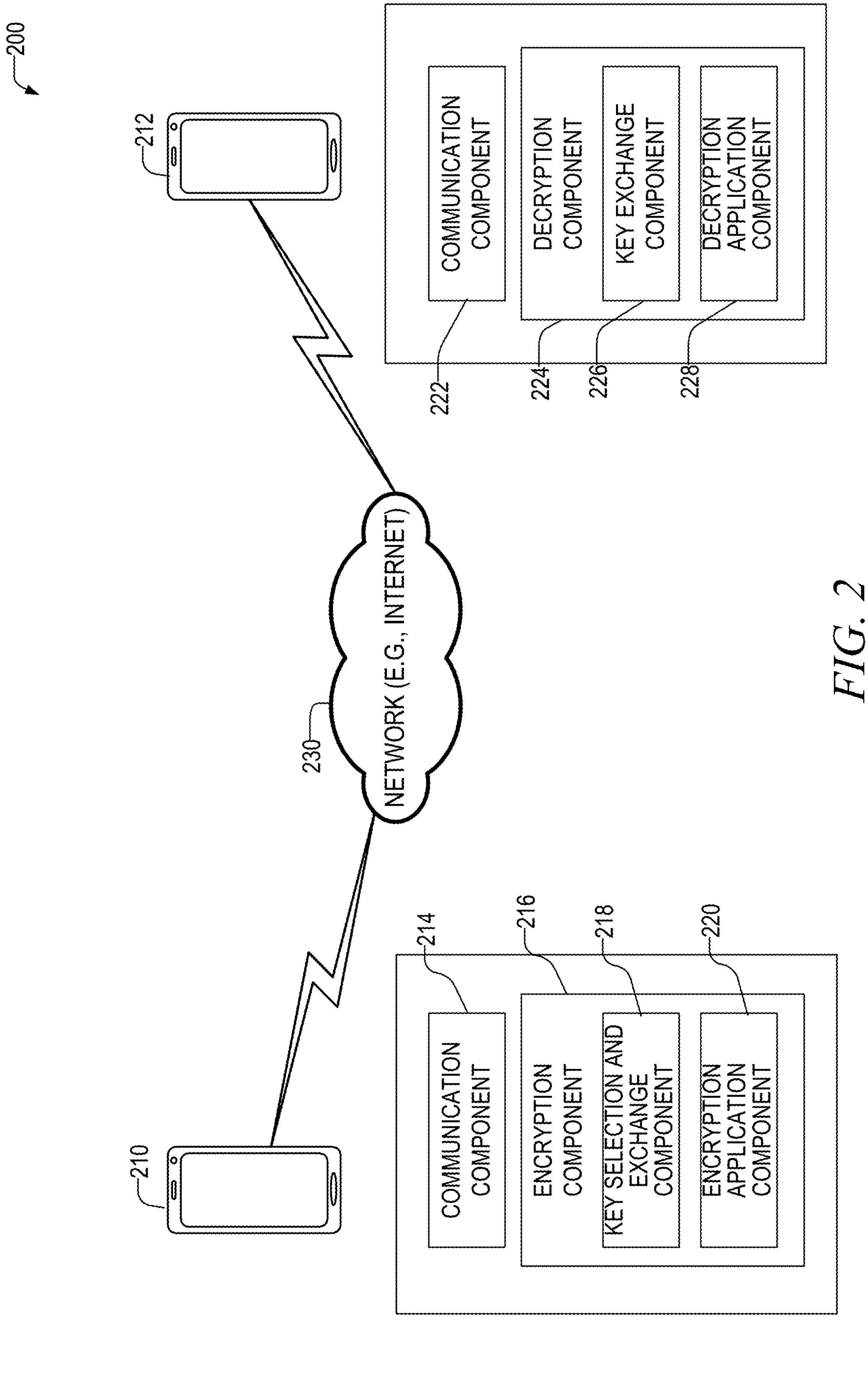
FIG. 2 illustrates a system of a lightweight encryption according to some examples of the present disclosure.

FIG. 2 illustrates a system 200 of a lightweight encryption according to some examples of the present disclosure. A sender computing device 210 may be a device that encrypts and transmits one or more messages to a receiving computing device 212. Sender computing device 210 may include a communication component 214 configured to send or receive one or more messages across network 230. For example, the communication component 214 may implement one or more protocols for communicating over network 230, such as Transmission Control Protocol (TCP), Internet Protocol (IP), and the like. The communication component 214 receives data to transmit, packetizes the data, adds appropriate headers, implements appropriate protocols, and transmits the data over network 230. In addition the communication component 214 receives data over the network, removes headers, and de-packetizes the data for forwarding on to other components of the sender computing device 210.

Encryption component 216 encrypts the data prior to delivering the data to communication component 214. Encryption component 216 includes a key selection and exchange component 218 for selecting keys and exchanging keys with the key exchange component 226 of decryption component 224 of the recipient computing device 212. For example, the key selection and exchange component may choose a key, encrypt the key with a commutative encryption function and, using communication component 214, transmit the encrypted key to the recipient computing device 212. The communication component 214 then receives a response from the recipient computing device 212. The response is the message sent by the sender computing device 210 to the recipient computing device 212 but encrypted using a commutative function of the recipient. The key selection and exchange component 218 may then apply the inverse of the commutative function applied by the key selection and exchange component 218 to what was received by the sender computing device 210 to obtain a modified message. The modified message is then transmitted by the communication component 214 back to the recipient computing device 212 through the communication component 214.

The encryption application component 220 performs the encryption of messages after the key exchange is completed. The encryption application component 220 processes the encryption key k by converting it into a signed-digit representation T using an odd base (such as 3, 5, or 7). The encryption application component 220 also identifies and maps a set of non-commutative functions (such as f1(x)=x+

3, f2(x)=2x, and f3(x)=x*x) to specific positions within T, where applying these functions in different orders produces different results.

For each portion of the message to be encrypted, the encryption application component 220 applies the sequence of non-commutative functions based on the values in T. At each position in T, the component determines whether to apply the corresponding non-commutative function one or more times if T contains a positive value at that position, apply the inverse of the corresponding non-commutative function one or more times if T contains a negative value at that position or skip applying the function if T contains a zero at that position. In some examples, the absolute value of T is used to determine how many times to apply the function. For example, if T is −2, then the inverse of the corresponding function is applied twice. As another example, if T is 5, then the function is applied five times.

This sequential application of functions transforms each message portion into its encrypted form. The non-commutative property of the functions ensures that applying them in an incorrect sequence prevents successful decryption of the message.

Recipient computing device 212 may also include a communication component 222 configured to send or receive one or more messages across network 230. For example, the communication component 222 may implement one or more protocols for communicating over network 230, such as Transmission Control Protocol (TCP), Internet Protocol (IP), and the like. The communication component 222 receives data to transmit, packetizes the data, adds appropriate headers, implements appropriate protocols, and transmits the data over network 230. In addition, the communication component 222 receives data over the network, removes headers, and de-packetizes the data for forwarding on to other components of the receiving computing device 212.

The recipient computing device 212, through the communication component 222, receives data from the network 230, including from the sender computing device 210. Decryption component 224 may decrypt messages that are received by the communication component 222, e.g., from sender computing device 210. Key exchange component 226 receives key exchange messages from the sender computing device 210. For example, a first message with a selected key encrypted by a sender's commutative encryption function. Upon receiving the selected key encrypted by the sender's commutative encryption function, the recipient computing device 212 may create a second message by further encrypting the received first message using a commutative function selected by the recipient computing device 212 and transmit the second message back to the sender computing device 210 via the communication component 222.

Upon transmitting the second message, the recipient computing device 212 may receive a third message from the sender computing device 210. The sender computing device 210 may take the second message, and apply the inverse of its commutative function applied to the first message. Once the third message is received, the key exchange component 226 may apply the reverse of the commutative encryption function applied by the recipient computing device 212 to yield the key.

The communication component 222 then receives the encrypted message portions. The decryption application component 228 processes these encrypted portions using the exchanged key k that has been converted to a signed-digit representation T using the same odd base used for encryption. For each encrypted message portion, the decryption application component 228 identifies the same sequence of non-commutative functions used during encryption, where each function corresponds to a position in T. The component then processes each position in T sequentially in the reverse manner that was applied for the encryption.

While FIG. 2 illustrated an example in which the recipient computing device 212 and sender computing device 210 only included components for decrypting and encrypting the message respectively, for instances in which the recipient computing device 212 may encrypt messages to other devices (such as sender computing device 210), the recipient computing device 212 may include an encryption component 216. Similarly, where the sender computing device 210 may need to decrypt communications, it may include a decryption component 224.

Figure 3:
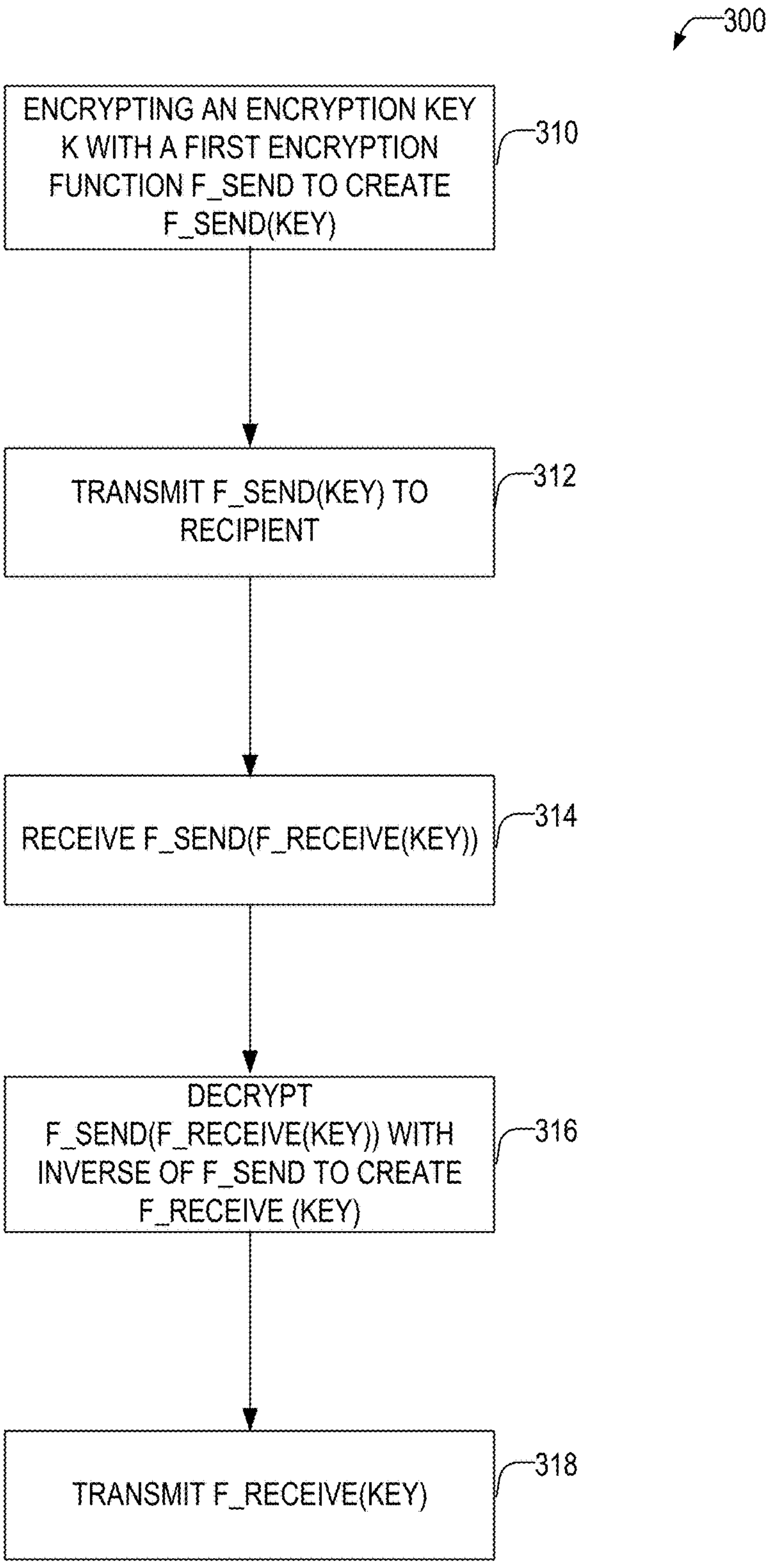
FIG. 3 illustrates a flow chart of a method of a sender in a key exchange protocol used for secure communications according to some examples of the present disclosure.

FIG. 3 illustrates a flow chart of a method 300 of a sender in a key exchange protocol used for secure communications according to some examples of the present disclosure. At operation 310, the sending device selects an encryption key and a commutative function (e.g., F_SEND(x)) and encrypts the encryption key with the commutative function to create first message containing F_SEND(key). As an example, if the key is 7, and the sending device selects a commutative function f(x)=2x, the encrypted key is 14 and this is sent to the recipient device at operation 312.

The recipient then applies its commutative function to the message sent at operation 312 (F_SEND(key)) to obtain F_RECEIVE(F_SEND(key)). For example, if the receiver's function is 3x, the value of the message 14 would be multiplied by three to obtain 42. This is then transmitted back to the sender.

At operation 314, the system receives, from the recipient, F_SEND(F_RECEIVE(key)). At operation 316, the inverse commutative function applied at operation 310 is applied to F_SEND(F_RECEIVE(key)) to produce F_RECEIVE (KEY). This is then transmitted back to the receiver at operation 318. In the previous example, the inverse of f(x)=2x is f(x)=½x. Applying ½x to 42 yields 21, which is transmitted back to the recipient. The recipient may then apply the inverse of the function F_RECEIVE(x) to obtain the key. In the example above where F_RECEIVE(x)=3x, then the inverse is ⅓x or ⅓(21)=7.

Figure 4:
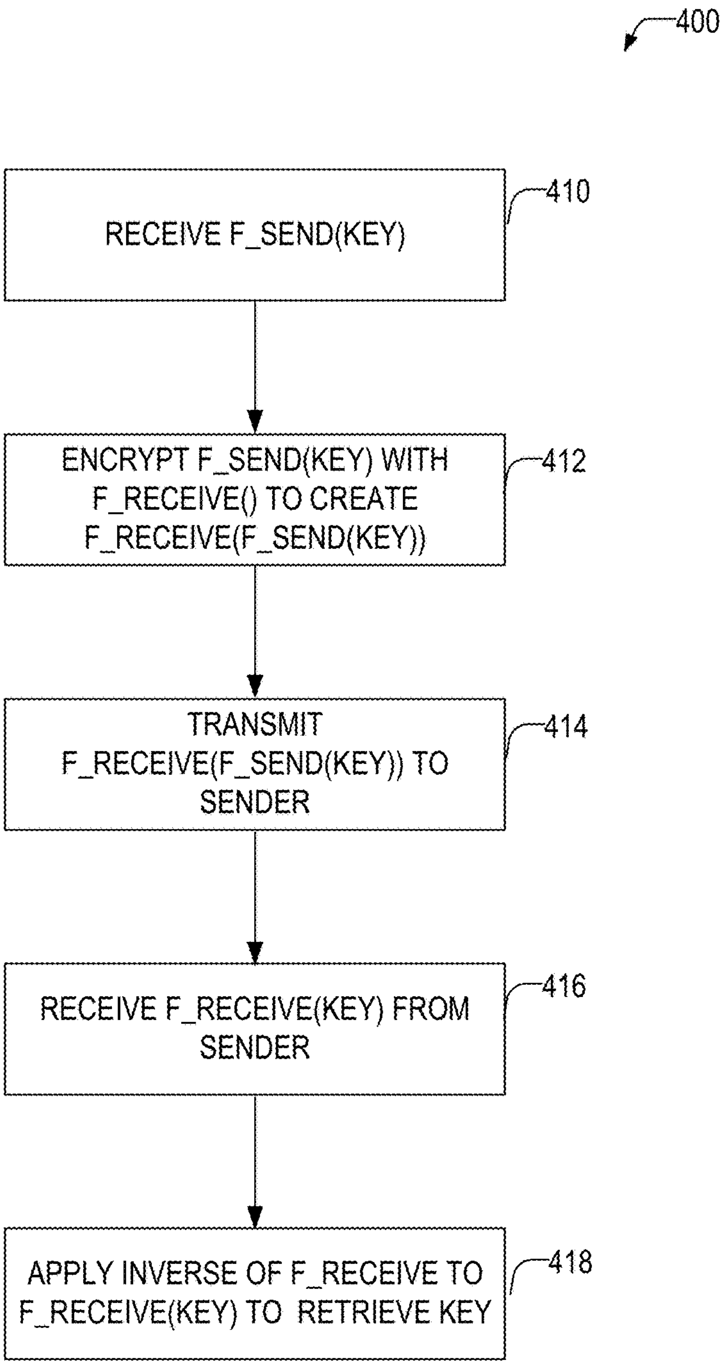
FIG. 4 illustrates a flow chart of a method of a receiver in a key exchange protocol used for secure communications according to some examples of the present disclosure.

FIG. 4 illustrates a flow chart of a method 400 of a recipient in a key exchange protocol used for secure communications according to some examples of the present disclosure. At operation 410, the recipient receives a message with a key that is encrypted with a commutative function of the sender: F_SEND(KEY). At operation 412, the recipient device selects a commutative function and applies it to the received message at operation 410 to create F_RECEIVE(F_SEND(key)) and transmits this to the sender at operation 414. At operation 416, the recipient receives a message from the sender with F_RECEIVE (KEY). At operation 418, the recipient applies the inverse of F_RECEIVE to the message to retrieve the key.

Figure 5:
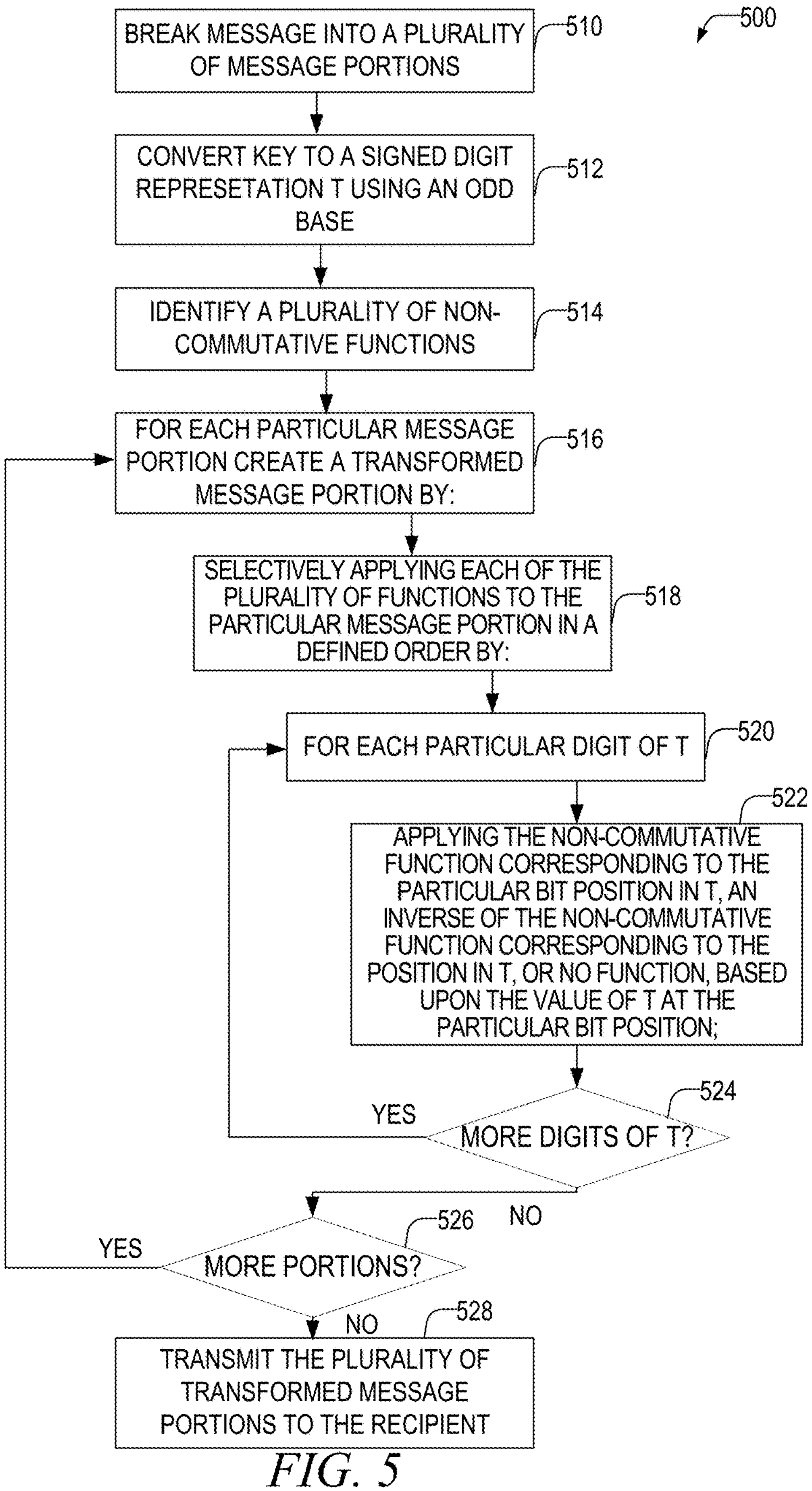
FIG. 5 illustrates a flowchart of a method of encrypting a message according to some examples of the present disclosure.

FIG. 5 illustrates a flowchart of a method 500 of encrypting a message according to some examples of the present disclosure. At operation 510, the sending computing device breaks the message into a plurality of message portions. In some examples, each message portion may be an ASCII value corresponding to a single message character of the plaintext message. In other examples, other portion sizes may be utilized, such as words, sentences, bytes, words, or the like.

At operation 512, the sending computing device converts the key k into a signed-digit representation T using an odd base (e.g., 3, 5, 7, or the like) to represent the key. For example, when converting k=7 to base 3, the sending computing device creates a representation T=[1,−1,1].

At operation 514, the sending computing device identifies a plurality of non-commutative functions. Each of the non-commutative functions corresponds to a particular bit of T. For example, a first function F1(x)=x+3 corresponds to a first bit (e.g., either the most or least significant bit) of T, a second function F2(x)=2x corresponds to the second bit of T, and a third function F3(x)=x*x corresponds to the third bit.

At operations 516, 518, 520, and 522, the sending computing device creates transformed message portions for each particular one of the plurality of message portions by selectively applying each of the plurality of specified non-commutative functions to the particular message portion in a defined order. Selectively applying comprises, for each particular digit position in T, applying the non-commutative function corresponding to the particular digit position in T, an inverse of the non-commutative function corresponding to the position in T, or no function, based upon the value of T at the particular digit position. For example, if the value of T in the digit position is a positive value, then the function is applied a number of times equal to the value of T. If the value of T in the digit position is a negative value, then the function is applied a number of times equal to the absolute value of T. Finally, if the value of T in the digit position is zero, then the function is not applied.

In other examples, if the value of T in the digit position is a negative value, then the function is applied a number of times equal to the value of T. If the value of T in the digit position is a positive value, then the function is applied a number of times equal to the absolute value of T. Finally, if the value of T in the digit position is zero, then the function is not applied. The above mappings from the value of T to either the function, its inverse, or not applying the function are exemplary, and a person of ordinary skill in the art with the benefit of the present disclosure will appreciate that other mappings may be utilized to convert between the value of the digit position of T and either the function, its inverse, or not applying the function.

As an example, if the functions are F1(x)=x+3; F2(x)=2x; F3(x)=x*x, the message portion is a value of 100, and the signed odd base representation of the key is [1,−1, 1], then the message portion is transformed into an encrypted (transformed) portion as follows: The value of 1 in the first digit position of T selects the function F1(x). F1(100)=103. Next, the value of −1 in the second digit position selects the function $F2^{-1}$=½(x) (the inverse of F2(x)=2x). $F2^{-1}$(103)=51.5. Next, the value of 1 in the third digit position selects a function F3(x)=x*x. F3(51.5)=2652.25.

While the defined order above is to apply the functions in order of most-significant to least-significant bit of T, in other examples, other orders may be used, such as a least-to-most significant bit order. In this example, the value of 1 in the third digit position is 1 selecting the function F3(100)=10,000. The value of −1 in the second digit position selects $F2^{-1}$(x)=½(x) (the inverse of F2(x)=2x). $F2^{-1}$(10,000)=5,000. The value of 1 in the first digit position selects F1(x)=x+3=5,003.

At operations 524, 526, the sending computing device iterates through all digits of T and all message portions until the encryption of all portions is complete. At operation 528, the sending computing device transmits the transformed message portions over a packet-based network to the recipient. In FIG. 5, all of the transformed portions are transmitted as an encrypted message at a same time, but in other examples, the transformed portions may be transmitted as they are encrypted.

Figure 6:
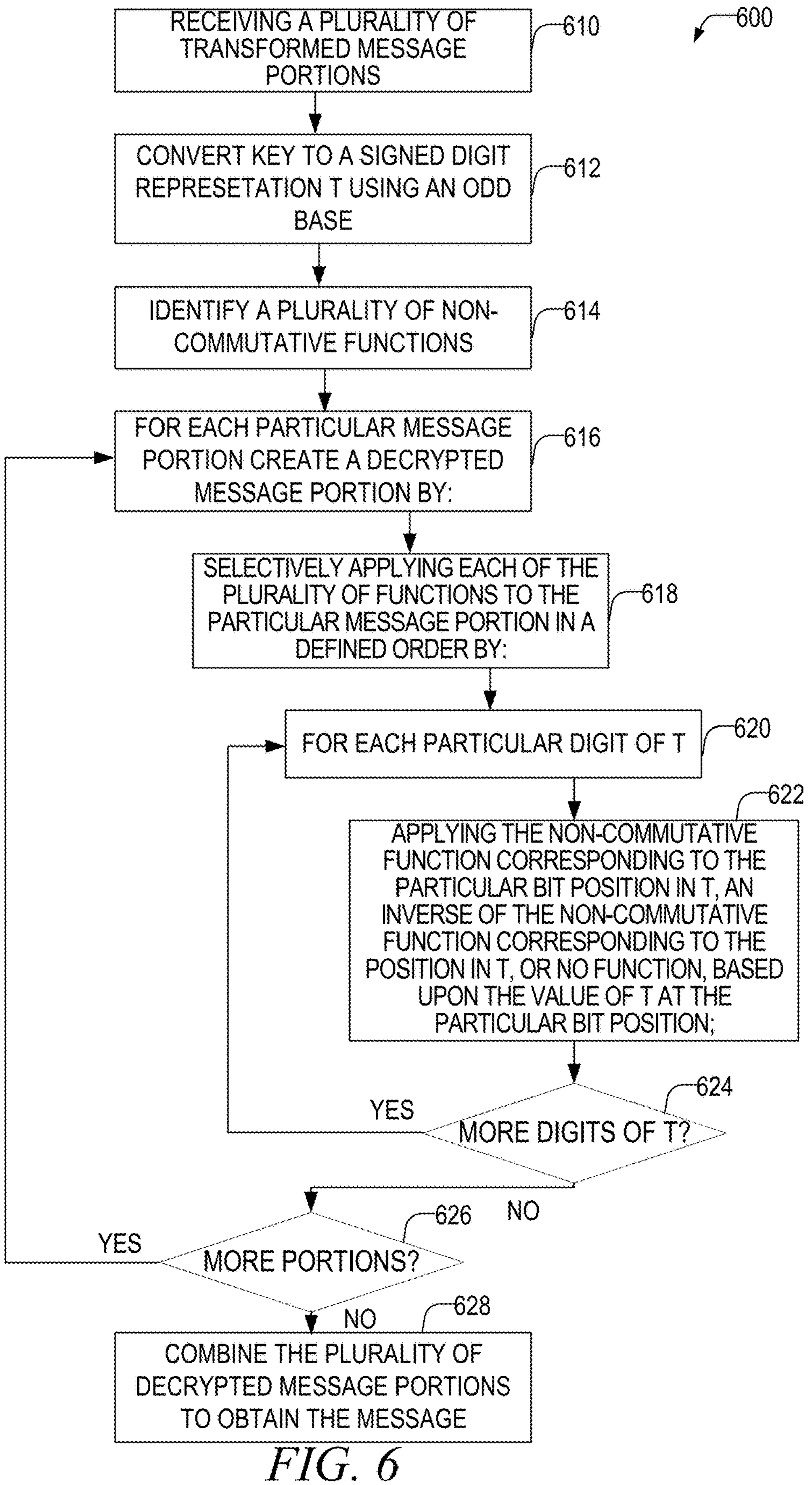
FIG. 6 illustrates a flowchart of a method of decrypting a message according to some examples of the present disclosure.

FIG. 6 illustrates a flowchart of a method 600 of decrypting a message according to some examples of the present disclosure. At operation 610, the recipient computing device receives a plurality of transformed message portions. In some examples, each transformed message portion may be a transformed ASCII value corresponding to a single message character of the original plaintext message. In other examples, other portion sizes may have been utilized, such as words, sentences, bytes, words, or the like.

At operation 612, the recipient computing device converts the key k into a signed-digit representation T using an odd base (e.g., 3, 5, 7, or the like) to represent the key. For example, when converting k=7 to base 3, the recipient computing device creates a representation T=[1,−1,1].

At operation 614, the recipient computing device identifies a plurality of non-commutative functions. Each of the non-commutative functions corresponds to a particular bit of T. For example, a first function F1(x)=x+3 corresponds to a first bit (e.g., either the most or least significant bit) of T, a second function F2(x)=2x corresponds to the second bit of T, and a third function F3(x)=x*x corresponds to the third bit. The plurality of non-commutative functions matches those applied by the sender.

At operations 616, 618, 620, and 622, the recipient computing device creates decrypted message portions by, for each particular one of the plurality of transformed message portions, selectively applying each of the plurality of specified non-commutative functions to the particular transformed message portion in a defined order. In some examples, the defined order may be a reverse order than was applied by the sender. Selectively applying comprises, for each particular digit position in T, applying the non-commutative function corresponding to the particular digit position in T, an inverse of the non-commutative function corresponding to the position in T, or no function, based upon the value of T at the particular digit position.

As previously mentioned, the system has a mapping for when to apply the function, its inverse, or no function based upon the value of T at a particular digit position. When decrypting the reverse mapping is applied. For example, if the message was encrypted by applying the function when the value of T in the digit position is a positive value, the inverse when the value of T is a negative value, and no function when the value of T is zero, then when decrypting, the inverse is applied when T is positive, the function is applied when T is negative, and when T is zero, nothing is applied.

Likewise, as previously stated, the order of applying the functions is also reversed from the encryption process.

As an example, if the functions are F1(x)=x+3; F2(x)=2x; F3(x)=x*x, the transformed message portion is a value of 5,003 (following from the last example above), and the signed odd base representation of the key is [1,−1, 1], then the transformed message portion is decrypted into an original portion as follows: The value of 1 in the first digit position of T selects the function $F1^{-1}$(x)=x−3. $F1^{-1}$(5,003)=5,000. Next, the value of −1 in the second digit position selects the function F2(x)=2x(the inverse of $F2^{-1}$(x)=½x). F2(5,000)=10,000. Next, the value of 1 in the third digit position selects a function $F3^{-1}$(x)=sqrt(x) (the inverse of F3(x)=x*x). $F3^{-1}$(10,000)=100.

While the defined order above is to apply the functions in order of most-significant to least-significant bit of T, in other examples, other orders may be used, such as a least-to-most significant bit order.

At operations 624 and 626, the recipient computing device iterates through all digits of T and all transformed message portions until the decryption of all portions is complete. At operation 628, the recipient computing device combines the plurality of decrypted message portions to obtain the original message. In some examples, the decrypted message may be provided to one or more other applications or layers in a communication protocol.

In some examples, a mode-based augmentation may provide another layer of security by applying variable offset substitutions to the message before encryption and after decryption. The sender and recipient share an array of offset values that is known only to them, with the array being of variable size. During the encryption process, before applying the non-commutative functions, the sender adds each offset value from the shared array to a corresponding character in the original message. These offset values act as a pre-encryption transformation that obscures the original character values even before the main encryption algorithm is applied. On the decryption side, after the recipient has applied the inverse non-commutative functions to recover the message portions, they remove the mode-based augmentation by subtracting the shared offset values from the corresponding decrypted characters. Since only the sender and recipient know the array of variable offset values, this provides an additional security measure even if an attacker were to determine the non-commutative functions being used.

The variable size of the offset array adds another dimension of security, as an attacker would need to determine not only the offset values but also the size and pattern of how these offsets are applied to the message characters. This augmentation can be particularly effective when combined with the ASCII representation of characters, as each offset modifies the numerical ASCII value before the main encryption processes begins.

Figure 7:
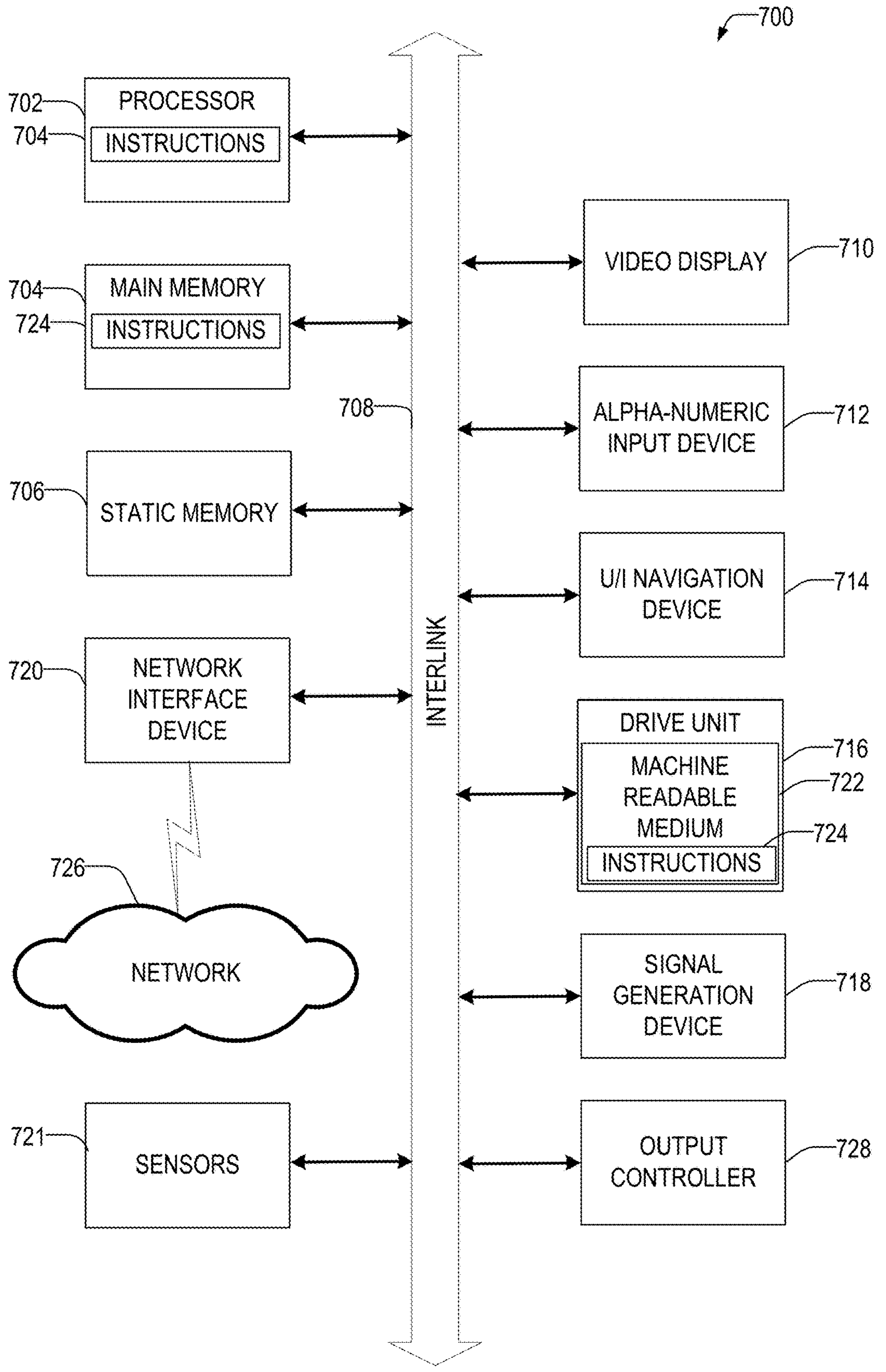
FIG. 7 illustrates a block diagram of an example machine upon which any one or more of the techniques discussed herein may be performed.

FIG. 7 illustrates a block diagram of an example machine 700 upon which any one or more of the techniques (e.g., methodologies) discussed herein may be performed. In alternative embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environment. The machine 700 may be in the form of a server, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations. Machine 700 may be an example of the sender computing device 110, 210; recipient computing device 112, 212. In some examples, the machine 700 may be configured to perform one or more aspects of the message flow 100, be configured to include the components of FIG. 2, and to perform the methods of any one or more of FIGS. 3-6.

Examples, as described herein, may include, or may operate on one or more logic units, components, or mechanisms (hereinafter "components"). Components are tangible entities (e.g., hardware) capable of performing specified operations and may be configured or arranged in a certain manner. In an example, circuits may be arranged (e.g., internally or with respect to external entities such as other circuits) in a specified manner as a component. In an example, the whole or part of one or more computer systems (e.g., a standalone, client or server computer system) or one or more hardware processors may be configured by firmware or software (e.g., instructions, an application portion, or an application) as a component that operates to perform specified operations. In an example, the software may reside on a machine readable medium. In an example, the software, when executed by the underlying hardware of the component, causes the hardware to perform the specified operations of the component.

Accordingly, the term "component" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which component are temporarily configured, each of the components need not be instantiated at any one moment in time. For example, where the components comprise a general-purpose hardware processor configured using software, the general-purpose hardware processor may be configured as respective different components at different times. Software may accordingly configure a hardware processor, for example, to constitute a particular module at one instance of time and to constitute a different component at a different instance of time.

Machine (e.g., computer system) 700 may include one or more hardware processors, such as processor 702. Processor 702 may be a central processing unit (CPU), a graphics processing unit (GPU), a hardware processor core, or any combination thereof. Machine 700 may include a main memory 704 and a static memory 706, some or all of which may communicate with each other via an interlink (e.g., bus) 708. Examples of main memory 704 may include Synchronous Dynamic Random-Access Memory (SDRAM), such as Double Data Rate memory, such as DDR4 or DDR5. Interlink 708 may be one or more different types of interlinks such that one or more components may be connected using a first type of interlink and one or more components may be connected using a second type of interlink. Example interlinks may include a memory bus, a peripheral component interconnect (PCI), a peripheral component interconnect express (PCIe) bus, a universal serial bus (USB), or the like.

The machine 700 may further include a display unit 710, an alphanumeric input device 712 (e.g., a keyboard), and a user interface (UI) navigation device 714 (e.g., a mouse). In an example, the display unit 710, input device 712 and UI navigation device 714 may be a touch screen display. The machine 700 may additionally include a storage device (e.g., drive unit) 716, a signal generation device 718 (e.g., a speaker), a network interface device 720, and one or more sensors 721, such as a global positioning system (GPS) sensor, compass, accelerometer, or other sensor. The machine 700 may include an output controller 728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 716 may include a machine readable medium 722 on which is stored one or more sets of data structures or instructions 724 (e.g., software) embodying or utilized by any one or more of the techniques or functions described herein. The instructions 724 may also reside, completely or at least partially, within the main memory 704, within static memory 706, or within the hardware processor 702 during execution thereof by the machine 700. In an example, one or any combination of the hardware processor 702, the main memory 704, the static memory 706, or the storage device 716 may constitute machine readable media.

While the machine readable medium 722 is illustrated as a single medium, the term "machine readable medium" may include a single medium or multiple media (e.g., a centralized or distributed database, and/or associated caches and servers) configured to store the one or more instructions 724.

The term "machine readable medium" may include any medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non-limiting machine-readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine-readable media. In some examples, machine readable media may include machine readable media that is not a transitory propagating signal.

The instructions 724 may further be transmitted or received over a communications network 726 using a transmission medium via the network interface device 720. The Machine 700 may communicate with one or more other machines wired or wirelessly utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks such as an Institute of Electrical and Electronics Engineers (IEEE) 802.11 family of standards known as Wi-Fi®, an IEEE 802.15.4 family of standards, a 5G New Radio (NR) family of standards, a Long Term Evolution (LTE) family of standards, a Universal Mobile Telecommunications System (UMTS) family of standards, peer-to-peer (P2P) networks, among others. In an example, the network interface device 720 may include one or more physical jacks (e.g., Ethernet, coaxial, or phone jacks) or one or more antennas to connect to the communications network 726. In an example, the network interface device 720 may include a plurality of antennas to wirelessly communicate using at least one of single-input multiple-output (SIMO), multiple-input multiple-output (MIMO), or multiple-input single-output (MISO) techniques. In some examples, the network interface device 720 may wirelessly communicate using Multiple User MIMO techniques.

OTHER NOTES AND EXAMPLES

Example 1 is a method for encrypting a message by a sender to a recipient, the method comprising: using one or more hardware processors: encrypting an encryption key k with a first encryption function to create an encrypted key, the first encryption function being a commutative function; transmitting the encrypted key to the recipient over a packet-based network; receiving a response message from the recipient over the packet-based network; decrypting the response message using a reverse function of the first encryption function to produce a first key message, the first key message comprising the encryption key k encrypted by a commutative encryption function of the recipient; transmitting the first key message to the recipient over the packet-based network, the first key message being decryptable by the recipient using a reverse function of the commutative encryption function of the recipient to produce the encryption key k; breaking the message into a plurality of message portions; converting the encryption key k into a signed-digit representation T using an odd base; identifying a plurality of non-commutative functions, each non-commutative function corresponding to a particular digit position of T; for each particular one of the plurality of message portions, creating a corresponding one of a plurality of transformed message portions by: selectively applying each of the plurality of non-commutative functions to the particular one of the plurality of message portions in a defined order, wherein selectively applying comprises, for each particular digit position in T: applying the non-commutative function corresponding to the particular digit position in T, an inverse of the non-commutative function corresponding to the particular digit position in T, or no function, based upon a value of T at the particular digit position; and transmitting, over the packet-based network, the plurality of transformed message portions to the recipient.

In Example 2, the subject matter of Example 1 includes, wherein selectively applying each of the plurality of non-commutative functions to the particular one of the plurality of message portions in the defined order comprises: applying the non-commutative function corresponding to the particular digit position in T when T is positive, an inverse of the non-commutative function corresponding to the position in T when T is negative, or no function when T is zero.

In Example 3, the subject matter of Examples 1-2 includes, wherein the odd base is greater than three, and wherein selectively applying each of the plurality of non-commutative functions to the particular one of the plurality of message portions in the defined order comprises: applying the non-commutative function corresponding to the particular digit position in T a number of times equal to the value of T when T is positive, an inverse of the non-commutative function corresponding to the position in T a number of times equal to an absolute value of T when T is negative, or no function when T is zero.

In Example 4, the subject matter of Examples 1-3 includes, transmitting the plurality of non-commutative functions and their order to the recipient.

In Example 5, the subject matter of Examples 1-4 includes, applying a mode-based augmentation to the message before encrypting, the mode-based augmentation comprising: storing a plurality of offset values in an array of variable size, the array being known only to the sender and the recipient; and adding each offset value from the array to a corresponding character in the message.

In Example 6, the subject matter of Examples 1-5 includes, wherein the message is converted to individual characters in an American Standard Code for Information Interchange (ASCII) prior to encryption and wherein each portion is a separate ASCII code.

In Example 7, the subject matter of Examples 1-6 includes, wherein the one or more hardware processors are part of an Internet of Things device (IoT).

Example 8 is a non-transitory machine-readable medium, storing instructions for encrypting a message by a sender to a recipient, the instructions, which when executed, cause a machine to perform operations comprising: encrypting an encryption key k with a first encryption function to create an encrypted key, the first encryption function being a commutative function; transmitting the encrypted key to the recipient over a packet-based network; receiving a response message from the recipient over the packet-based network; decrypting the response message using a reverse function of the first encryption function to produce a first key message, the first key message comprising the encryption key k encrypted by a commutative encryption function of the recipient; transmitting the first key message to the recipient over the packet-based network, the first key message being decryptable by the recipient using a reverse function of the commutative encryption function of the recipient to produce the encryption key k; breaking the message into a plurality of message portions; converting the encryption key k into a signed-digit representation T using an odd base; identifying a plurality of non-commutative functions, each non-commutative function corresponding to a particular digit position of T; for each particular one of the plurality of message portions, creating a corresponding one of a plurality of transformed message portions by: selectively applying each of the plurality of non-commutative functions to the particular one of the plurality of message portions in a defined order, wherein selectively applying comprises, for each particular digit position in T: applying the non-commutative function corresponding to the particular digit position in T, an inverse of the non-commutative function corresponding to the particular digit position in T, or no function, based upon a value of T at the particular digit position; and transmitting, over the packet-based network, the plurality of transformed message portions to the recipient.

In Example 9, the subject matter of Example 8 includes, wherein the operation of selectively applying each of the plurality of non-commutative functions to the particular one of the plurality of message portions in the defined order comprises: applying the non-commutative function corresponding to the particular digit position in T when T is positive, an inverse of the non-commutative function corresponding to the position in T when T is negative, or no function when T is zero.

In Example 10, the subject matter of Examples 8-9 includes, wherein the odd base is greater than three, and wherein the operation of selectively applying each of the plurality of non-commutative functions to the particular one of the plurality of message portions in the defined order comprises: applying the non-commutative function corresponding to the particular digit position in T a number of times equal to the value of T when T is positive, an inverse of the non-commutative function corresponding to the position in T a number of times equal to an absolute value of T when T is negative, or no function when T is zero.

In Example 11, the subject matter of Examples 8-10 includes, wherein the operations further comprise: transmitting the plurality of non-commutative functions and their order to the recipient.

In Example 12, the subject matter of Examples 8-11 includes, wherein the operations further comprise applying a mode-based augmentation to the message before encrypting, the mode-based augmentation comprising: storing a plurality of offset values in an array of variable size, the array being known only to the sender and the recipient; and adding each offset value from the array to a corresponding character in the message.

In Example 13, the subject matter of Examples 8-12 includes, wherein the message is converted to individual characters in an American Standard Code for Information Interchange (ASCII) prior to encryption and wherein each portion is a separate ASCII code.

In Example 14, the subject matter of Examples 8-13 includes, wherein the machine is part of an Internet of Things device (IoT).

Example 15 is a computing device for encrypting a message by a sender to a recipient, the computing device comprising: a hardware processor; a memory, the memory storing instructions, which when executed by the hardware processor cause the computing device to perform operations comprising: encrypting an encryption key k with a first encryption function to create an encrypted key, the first encryption function being a commutative function; transmitting the encrypted key to the recipient over a packet-based network; receiving a response message from the recipient over the packet-based network; decrypting the response message using a reverse function of the first encryption function to produce a first key message, the first key message comprising the encryption key k encrypted by a commutative encryption function of the recipient; transmitting the first key message to the recipient over the packet-based network, the first key message being decryptable by the recipient using a reverse function of the commutative encryption function of the recipient to produce the encryption key k; breaking the message into a plurality of message portions; converting the encryption key k into a signed-digit representation T using an odd base; identifying a plurality of non-commutative functions, each non-commutative function corresponding to a particular digit position of T; for each particular one of the plurality of message portions, creating a corresponding one of a plurality of transformed message portions by: selectively applying each of the plurality of non-commutative functions to the particular one of the plurality of message portions in a defined order, wherein selectively applying comprises, for each particular digit position in T: applying the non-commutative function corresponding to the particular digit position in T, an inverse of the non-commutative function corresponding to the particular digit position in T, or no function, based upon a value of T at the particular digit position; and transmitting, over the packet-based network, the plurality of transformed message portions to the recipient.

In Example 16, the subject matter of Example 15 includes, wherein the operation of selectively applying each of the plurality of non-commutative functions to the particular one of the plurality of message portions in the defined order comprises: applying the non-commutative function corresponding to the particular digit position in T when T is positive, an inverse of the non-commutative function corresponding to the position in T when T is negative, or no function when T is zero.

In Example 17, the subject matter of Examples 15-16 includes, wherein the odd base is greater than three, and wherein the operation of selectively applying each of the plurality of non-commutative functions to the particular one of the plurality of message portions in the defined order comprises: applying the non-commutative function corresponding to the particular digit position in T a number of times equal to the value of T when T is positive, an inverse of the non-commutative function corresponding to the position in T a number of times equal to an absolute value of T when T is negative, or no function when T is zero.

In Example 18, the subject matter of Examples 15-17 includes, wherein the operations further comprise: transmitting the plurality of non-commutative functions and their order to the recipient.

In Example 19, the subject matter of Examples 15-18 includes, wherein the operations further comprise applying a mode-based augmentation to the message before encrypting, the mode-based augmentation comprising: storing a plurality of offset values in an array of variable size, the array being known only to the sender and the recipient; and adding each offset value from the array to a corresponding character in the message.

In Example 20, the subject matter of Examples 15-19 includes, wherein the message is converted to individual characters in an American Standard Code for Information Interchange (ASCII) prior to encryption and wherein each portion is a separate ASCII code.

In Example 21, the subject matter of Examples 15-20 includes, wherein the computing device is an Internet of Things device (IoT).

Example 22 is a method for decrypting a message by a recipient from a sender, the method comprising: using one or more hardware processors: receiving an encrypted key from the sender over a packet-based network; encrypting the encrypted key with a second encryption function to create a doubly-encrypted key, the second encryption function being a commutative function; transmitting the doubly-encrypted key to the sender over the packet-based network; receiving a first key message from the sender over the packet-based network; decrypting the first key message using a reverse function of the second encryption function to produce a key k; receiving a plurality of transformed message portions from the sender over the packet-based network; converting the key k into a signed-digit representation T using an odd base; identifying a plurality of non-commutative functions, each non-commutative function corresponding to a particular digit position of T; for each particular one of the plurality of transformed message portions, creating a corresponding one of a plurality of decrypted message portions by: selectively applying each of the plurality of non-commutative functions to the particular one of the plurality of transformed message portions in a defined order, wherein selectively applying comprises, for each particular digit position in T: applying an inverse of the non-commutative function corresponding to the particular digit position in T, the non-commutative function corresponding to the particular digit position in T, or no function, based upon a value of T at the particular digit position; and combining the plurality of decrypted message portions to obtain a non-encrypted original message.

In Example 23, the subject matter of Example 22 includes, wherein selectively applying each of the plurality of non-commutative functions to the particular one of the plurality of transformed message portions in the defined order comprises: applying the inverse of the non-commutative function corresponding to the particular digit position in T when T is positive, the non-commutative function corresponding to the position in T when T is negative, or no function when T is zero.

In Example 24, the subject matter of Examples 22-23 includes, wherein the odd base is greater than three, and wherein selectively applying each of the plurality of non-commutative functions to the particular one of the plurality of transformed message portions in the defined order comprises: applying the inverse of the non-commutative function corresponding to the particular digit position in T a number of times equal to the value of T when T is positive, the non-commutative function corresponding to the position in T a number of times equal to an absolute value of T when T is negative, or no function when T is zero.

In Example 25, the subject matter of Examples 22-24 includes, receiving the plurality of non-commutative functions and their order from the sender.

In Example 26, the subject matter of Examples 22-25 includes, applying a mode-based augmentation to the non-encrypted original message, the mode-based augmentation comprising: accessing a plurality of offset values in an array of variable size, the array being known only to the sender and the recipient; and subtracting each offset value from the array from a corresponding character in the non-encrypted original message.

In Example 27, the subject matter of Examples 22-26 includes, wherein the decrypted message portions are converted from American Standard Code for Information Interchange (ASCII) to individual characters.

In Example 28, the subject matter of Examples 22-27 includes, wherein the defined order is a reverse order from the order used to encrypt the message portions.

Example 29 is a non-transitory machine-readable medium, storing instructions for decrypting a message by a recipient from a sender, the instructions, which when executed, cause the machine to perform operations comprising: receiving an encrypted key from the sender over a packet-based network; encrypting the encrypted key with a second encryption function to create a doubly-encrypted key, the second encryption function being a commutative function; transmitting the doubly-encrypted key to the sender over the packet-based network; receiving a first key message from the sender over the packet-based network; decrypting the first key message using a reverse function of the second encryption function to produce a key k; receiving a plurality of transformed message portions from the sender over the packet-based network; converting the key k into a signed-digit representation T using an odd base; identifying a plurality of non-commutative functions, each non-commutative function corresponding to a particular digit position of T; for each particular one of the plurality of transformed message portions, creating a corresponding one of a plurality of decrypted message portions by: selectively applying each of the plurality of non-commutative functions to the particular one of the plurality of transformed message portions in a defined order, wherein selectively applying comprises, for each particular digit position in T: applying an inverse of the non-commutative function corresponding to the particular digit position in T, the non-commutative function corresponding to the particular digit position in T, or no function, based upon a value of T at the particular digit position; and combining the plurality of decrypted message portions to obtain a non-encrypted original message.

In Example 30, the subject matter of Example 29 includes, wherein the operation of selectively applying each of the plurality of non-commutative functions to the particular one of the plurality of transformed message portions in the defined order comprises: applying the inverse of the non-commutative function corresponding to the particular digit position in T when T is positive, the non-commutative function corresponding to the position in T when T is negative, or no function when T is zero.

In Example 31, the subject matter of Examples 29-30 includes, wherein the odd base is greater than three, and wherein the operation of selectively applying each of the plurality of non-commutative functions to the particular one of the plurality of transformed message portions in the defined order comprises: applying the inverse of the non-commutative function corresponding to the particular digit position in T a number of times equal to the value of T when T is positive, the non-commutative function corresponding to the position in T a number of times equal to an absolute value of T when T is negative, or no function when T is zero.

In Example 32, the subject matter of Examples 29-31 includes, wherein the operations further comprise receiving the plurality of non-commutative functions and their order from the sender.

In Example 33, the subject matter of Examples 29-32 includes, wherein the operations further comprise applying a mode-based augmentation to the non-encrypted original message, the mode-based augmentation comprising: accessing a plurality of offset values in an array of variable size, the array being known only to the sender and the recipient; and subtracting each offset value from the array from a corresponding character in the non-encrypted original message.

In Example 34, the subject matter of Examples 29-33 includes, wherein the operations further comprise converting the decrypted message portions from American Standard Code for Information Interchange (ASCII) to individual characters.

In Example 35, the subject matter of Examples 29-34 includes, wherein the defined order is a reverse order from the order used to encrypt the message portions.

Example 36 is a computing device for decrypting a message by a recipient from a sender, the computing device comprising: a hardware processor; a memory, the memory storing instructions, which when executed by the hardware processor cause the computing device to perform operations comprising: receiving an encrypted key from the sender over a packet-based network; encrypting the encrypted key with a second encryption function to create a doubly-encrypted key, the second encryption function being a commutative function; transmitting the doubly-encrypted key to the sender over the packet-based network; receiving a first key message from the sender over the packet-based network; decrypting the first key message using a reverse function of the second encryption function to produce a key k; receiving a plurality of transformed message portions from the sender over the packet-based network; converting the key k into a signed-digit representation T using an odd base; identifying a plurality of non-commutative functions, each non-commutative function corresponding to a particular digit position of T; for each particular one of the plurality of transformed message portions, creating a corresponding one of a plurality of decrypted message portions by: selectively applying each of the plurality of non-commutative functions to the particular one of the plurality of transformed message portions in a defined order, wherein selectively applying comprises, for each particular digit position in T: applying an inverse of the non-commutative function corresponding to the particular digit position in T, the non-commutative function corresponding to the particular digit position in T, or no function, based upon a value of T at the particular digit position; and combining the plurality of decrypted message portions to obtain a non-encrypted original message.

In Example 37, the subject matter of Example 36 includes, wherein the operation of selectively applying each of the plurality of non-commutative functions to the particular one of the plurality of transformed message portions in the defined order comprises: applying the inverse of the non-commutative function corresponding to the particular digit position in T when T is positive, the non-commutative function corresponding to the position in T when T is negative, or no function when T is zero.

In Example 38, the subject matter of Examples 36-37 includes, wherein the odd base is greater than three, and wherein the operation of selectively applying each of the plurality of non-commutative functions to the particular one of the plurality of transformed message portions in the defined order comprises: applying the inverse of the non-commutative function corresponding to the particular digit position in T a number of times equal to the value of T when T is positive, the non-commutative function corresponding to the position in T a number of times equal to an absolute value of T when T is negative, or no function when T is zero.

In Example 39, the subject matter of Examples 36-38 includes, wherein the operations further comprise receiving the plurality of non-commutative functions and their order from the sender.

In Example 40, the subject matter of Examples 36-39 includes, wherein the operations further comprise applying a mode-based augmentation to the non-encrypted original message, the mode-based augmentation comprising: accessing a plurality of offset values in an array of variable size, the array being known only to the sender and the recipient; and subtracting each offset value from the array from a corresponding character in the non-encrypted original message.

In Example 41, the subject matter of Examples 36-40 includes, wherein the operations further comprise converting the decrypted message portions from American Standard Code for Information Interchange (ASCII) to individual characters.

In Example 42, the subject matter of Examples 36-41 includes, wherein the defined order is a reverse order from the order used to encrypt the message portions.

Example 43 is at least one machine-readable medium including instructions that, when executed by processing circuitry, cause the processing circuitry to perform operations to implement of any of Examples 1-42.

Example 44 is an apparatus comprising means to implement of any of Examples 1-42.

Example 45 is a system to implement of any of Examples 1-42.

Example 46 is a method to implement of any of Examples 1-42.

What is claimed is:

1. A method for encrypting a message by a sender to a recipient, the method comprising:

using one or more hardware processors:

encrypting an encryption key k with a first encryption function to create an encrypted key, the first encryption function being a commutative function;

transmitting the encrypted key to the recipient over a packet-based network;

receiving a response message from the recipient over the packet-based network;

decrypting the response message using a reverse function of the first encryption function to produce a first key message, the first key message comprising the encryption key k encrypted by a commutative encryption function of the recipient;

transmitting the first key message to the recipient over the packet-based network, the first key message being decryptable by the recipient using a reverse function of the commutative encryption function of the recipient to produce the encryption key k;

breaking the message into a plurality of message portions;

converting the encryption key k into a signed-digit representation T using an odd base;

identifying a plurality of non-commutative functions, each non-commutative function corresponding to a particular digit position of T;

for each particular one of the plurality of message portions, creating a corresponding one of a plurality of transformed message portions by:

selectively applying each of the plurality of non-commutative functions to the particular one of the plurality of message portions in a defined order, wherein selectively applying comprises, for each particular digit position in T:

applying the non-commutative function corresponding to the particular digit position in T, an inverse of the non-commutative function corresponding to the particular digit position in T, or no function, based upon a value of T at the particular digit position; and transmitting, over the packet-based network, the plurality of transformed message portions to the recipient.

2. The method of claim 1, wherein selectively applying each of the plurality of non-commutative functions to the particular one of the plurality of message portions in the defined order comprises:

applying the non-commutative function corresponding to the particular digit position in T when T is positive, an inverse of the non-commutative function corresponding to the position in T when T is negative, or no function when T is zero.

3. The method of claim 1, wherein the odd base is greater than three, and wherein selectively applying each of the plurality of non-commutative functions to the particular one of the plurality of message portions in the defined order comprises:

applying the non-commutative function corresponding to the particular digit position in T a number of times equal to the value of T when T is positive, an inverse of the non-commutative function corresponding to the position in T a number of times equal to an absolute value of T when T is negative, or no function when T is zero.

4. The method of claim 1, further comprising transmitting the plurality of non-commutative functions and their order to the recipient.

5. The method of claim 1, further comprising applying a mode-based augmentation to the message before encrypting, the mode-based augmentation comprising:

storing a plurality of offset values in an array of variable size, the array being known only to the sender and the recipient; and adding each offset value from the array to a corresponding character in the message.

6. The method of claim 1, wherein the message is converted to individual characters in an American Standard Code for Information Interchange (ASCII) prior to encryption and wherein each portion is a separate ASCII code.

7. The method of claim 1, wherein the one or more hardware processors are part of an Internet of Things device (IoT).

8. A non-transitory machine-readable medium, storing instructions for encrypting a message by a sender to a recipient, the instructions, which when executed, cause a machine to perform operations comprising:

encrypting an encryption key k with a first encryption function to create an encrypted key, the first encryption function being a commutative function;

transmitting the encrypted key to the recipient over a packet-based network;

receiving a response message from the recipient over the packet-based network;

decrypting the response message using a reverse function of the first encryption function to produce a first key message, the first key message comprising the encryption key k encrypted by a commutative encryption function of the recipient;

transmitting the first key message to the recipient over the packet-based network, the first key message being decryptable by the recipient using a reverse function of the commutative encryption function of the recipient to produce the encryption key k;

breaking the message into a plurality of message portions;

converting the encryption key k into a signed-digit representation T using an odd base;

identifying a plurality of non-commutative functions, each non-commutative function corresponding to a particular digit position of T;

for each particular one of the plurality of message portions, creating a corresponding one of a plurality of transformed message portions by:

selectively applying each of the plurality of non-commutative functions to the particular one of the plurality of message portions in a defined order, wherein selectively applying comprises, for each particular digit position in T:

applying the non-commutative function corresponding to the particular digit position in T, an inverse of the non-commutative function corresponding to the particular digit position in T, or no function, based upon a value of T at the particular digit position; and transmitting, over the packet-based network, the plurality of transformed message portions to the recipient.

9. The non-transitory machine-readable medium of claim 8, wherein the operation of selectively applying each of the plurality of non-commutative functions to the particular one of the plurality of message portions in the defined order comprises: applying the non-commutative function corresponding to the particular digit position in T when T is positive, an inverse of the non-commutative function corresponding to the position in T when T is negative, or no function when T is zero.

10. The non-transitory machine-readable medium of claim 8, wherein the odd base is greater than three, and wherein the operation of selectively applying each of the plurality of non-commutative functions to the particular one of the plurality of message portions in the defined order comprises: applying the non-commutative function corresponding to the particular digit position in T a number of times equal to the value of T when T is positive, an inverse of the non-commutative function corresponding to the position in T a number of times equal to an absolute value of T when T is negative, or no function when T is zero.

11. The non-transitory machine-readable medium of claim 8, wherein the operations further comprise: transmitting the plurality of non-commutative functions and their order to the recipient.

12. The non-transitory machine-readable medium of claim 8, wherein the operations further comprise applying a mode-based augmentation to the message before encrypting, the mode-based augmentation comprising: storing a plurality of offset values in an array of variable size, the array being known only to the sender and the recipient; and adding each offset value from the array to a corresponding character in the message.

13. The non-transitory machine-readable medium of claim 8, wherein the message is converted to individual characters in an American Standard Code for Information Interchange (ASCII) prior to encryption and wherein each portion is a separate ASCII code.

14. The non-transitory machine-readable medium of claim 8, wherein the machine is part of an Internet of Things device (IoT).

15. A computing device for encrypting a message by a sender to a recipient, the computing device comprising:

a hardware processor;

a memory, the memory storing instructions, which when executed by the hardware processor cause the computing device to perform operations comprising:

encrypting an encryption key k with a first encryption function to create an encrypted key, the first encryption function being a commutative function;

transmitting the encrypted key to the recipient over a packet-based network;

receiving a response message from the recipient over the packet-based network;

decrypting the response message using a reverse function of the first encryption function to produce a first key message, the first key message comprising the encryption key k encrypted by a commutative encryption function of the recipient;

transmitting the first key message to the recipient over the packet-based network, the first key message being decryptable by the recipient using a reverse function of the commutative encryption function of the recipient to produce the encryption key k;

breaking the message into a plurality of message portions;

converting the encryption key k into a signed-digit representation T using an odd base;

identifying a plurality of non-commutative functions, each non-commutative function corresponding to a particular digit position of T;

for each particular one of the plurality of message portions, creating a corresponding one of a plurality of transformed message portions by:

selectively applying each of the plurality of non-commutative functions to the particular one of the plurality of message portions in a defined order, wherein selectively applying comprises, for each particular digit position in T:

applying the non-commutative function corresponding to the particular digit position in T, an inverse of the non-commutative function corresponding to the particular digit position in T, or no function, based upon a value of T at the particular digit position; and transmitting, over the packet-based network, the plurality of transformed message portions to the recipient.

16. The computing device of claim 15, wherein the operation of selectively applying each of the plurality of non-commutative functions to the particular one of the plurality of message portions in the defined order comprises: applying the non-commutative function corresponding to the particular digit position in T when T is positive, an inverse of the non-commutative function corresponding to the position in T when T is negative, or no function when T is zero.

17. The computing device of claim 15, wherein the odd base is greater than three, and wherein the operation of selectively applying each of the plurality of non-commutative functions to the particular one of the plurality of message portions in the defined order comprises: applying the non-commutative function corresponding to the particular digit position in T a number of times equal to the value of T when T is positive, an inverse of the non-commutative function corresponding to the position in T a number of times equal to an absolute value of T when T is negative, or no function when T is zero.

18. The computing device of claim 15, wherein the operations further comprise: transmitting the plurality of non-commutative functions and their order to the recipient.

19. The computing device of claim 15, wherein the operations further comprise applying a mode-based augmentation to the message before encrypting, the mode-based augmentation comprising: storing a plurality of offset values in an array of variable size, the array being known only to the sender and the recipient; and adding each offset value from the array to a corresponding character in the message.

20. The computing device of claim 15, wherein the message is converted to individual characters in an American Standard Code for Information Interchange (ASCII) prior to encryption and wherein each portion is a separate ASCII code.

* * * * *